United States Patent
Huang et al.

(10) Patent No.: US 11,250,185 B2
(45) Date of Patent: Feb. 15, 2022

(54) METHOD AND APPARATUS FOR CALCULATING EQUIVALENT MECHANICAL PARAMETERS OF FILM LAYER ETCHING REGION

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Chunchieh Huang, Beijing (CN); Qi Wang, Beijing (CN); Jian Zhang, Beijing (CN); Shouhua Lv, Beijing (CN); Chengfa Yang, Beijing (CN); Meng Zhou, Beijing (CN)

(73) Assignees: ORDOS YUANSHENG OPTOELECTRONICS CO., LTD., Ordos (CN); BOE TECHNOLOGY GROUP CO., LTD., Beijing (CN)

( * ) Notice: Subject to any disclaimer, the term of this patent is extended or adjusted under 35 U.S.C. 154(b) by 391 days.

(21) Appl. No.: 16/479,182

(22) PCT Filed: Sep. 25, 2018

(86) PCT No.: PCT/CN2018/107412
§ 371 (c)(1),
(2) Date: Jul. 18, 2019

(87) PCT Pub. No.: WO2019/062727
PCT Pub. Date: Apr. 4, 2019

(65) Prior Publication Data
US 2019/0370423 A1 Dec. 5, 2019

(30) Foreign Application Priority Data
Sep. 26, 2017 (CN) .......................... 201710883448.6

(51) Int. Cl.
*G06F 30/20* (2020.01)
*H01L 21/768* (2006.01)
*G06F 30/30* (2020.01)

(52) U.S. Cl.
CPC ........ *G06F 30/20* (2020.01); *H01L 21/76829* (2013.01); *G06F 30/30* (2020.01)

(58) Field of Classification Search
None
See application file for complete search history.

(56) References Cited

U.S. PATENT DOCUMENTS

| 10,002,222 | B2 * | 6/2018 | Cline | G03F 7/2022 |
| 10,339,250 | B2 * | 7/2019 | Tien  | G06F 30/398 |

FOREIGN PATENT DOCUMENTS

WO    2015/007190 A2    1/2015

OTHER PUBLICATIONS

Chouaf, A. et al.: "Stress Analysis at Singular Points of Micromachined Silicon Membranes," Sensors and Actuators A:Physical, Elsevier BV, NL, vol. 84, No. 1-2, Aug. 1, 2000, pp. 109-115, XP004222501.

(Continued)

*Primary Examiner* — Steven M Christopher
(74) *Attorney, Agent, or Firm* — McDermott Will and Emery LLP

(57) ABSTRACT

A method for calculating equivalent mechanical parameters of a film layer etching region is provided, by which more accurate equivalent mechanical parameters, which will be used in a process of manufacturing a display substrate of a terminal, may be obtained, thereby obtaining a display substrate with less defects. The method includes: selecting at least a part of the film layer etching region as an analysis region; establishing a planar model corresponding to the analysis region; performing grid division on the planar model at a first density; analyzing, by means of a finite (Continued)

element method, first simulation stresses of the planar model in simulated boundary conditions according to the actual mechanical parameters of a film layer material and the grid division of the first density; and calculating equivalent mechanical parameters.

20 Claims, 7 Drawing Sheets

(56) References Cited

OTHER PUBLICATIONS

Extended European Search Report issued in European Patent Application No. 18860934.1, dated Apr. 28, 2021.

* cited by examiner

METHOD AND APPARATUS FOR CALCULATING EQUIVALENT MECHANICAL PARAMETERS OF FILM LAYER ETCHING REGION

CROSS-REFERENCE TO RELATED APPLICATION

The present application is a national phase entry under 35 USC 371 of International Patent Application No. PCT/CN2018/107412 filed on Sep. 25, 2018, which claims priority to Chinese Patent Application No. 201710883448.6, filed with the Chinese Patent Office on Sep. 26, 2017, titled "METHOD AND APPARATUS FOR CALCULATING EQUIVALENT MECHANICAL PARAMETERS OF FILM LAYER ETCHING REGION", which are incorporated herein by reference in their entirety.

TECHNICAL FIELD

The present disclosure relates to the technical field of etching region design, and in particular, to a method and an apparatus for calculating equivalent mechanical parameters of an etching region of film layer(s).

BACKGROUND

Many film layers of a display substrate need to be etched with opening(s) (a pattern), to form an etching region (for example, a tiny etching region). Different etching regions have different stress distributions and deformations, and an inappropriate deformation of an etching region may cause defects. Therefore, the stress distribution and deformation of a designed etching region need to be calculated first. If the deformation is not appropriate, the number, size, shape and position of the opening(s) will be adjusted.

SUMMARY

An aspect of the present disclosure provides a method for calculating equivalent mechanical parameters of a film layer etching region, and the method includes:

selecting at least a portion of the film etching region as an analysis region;

establishing a planar model corresponding to the analysis region;

performing grid division on the planar model at a first density;

analyzing, by means of a finite element method, first simulated stresses of the planar model under simulated boundary conditions according to actual mechanical parameters of a film layer material and the grid division at the first density; and calculating equivalent mechanical parameters, wherein under the simulated boundary conditions, the equivalent mechanical parameters enable an anisotropic planar blind plate having a same size as that of a boundary of the planar model to reach the first simulated stresses.

In some embodiments, the method further includes: performing grid division on the planar model at a second density, wherein the second density is different from the first density; analyzing, by means of the finite element method, second simulated stresses of the planar model under the simulated boundary conditions according to the actual mechanical parameters of the film layer material and grid division at the second density; and comparing whether a difference ratio between each second simulated stress and a corresponding first simulated stress exceeds a threshold value; if yes, returning to the step of performing grid division on the planar model at a first density and reselecting a larger first density; if no, proceeding to a next step.

In some embodiments, the second density is greater than the first density.

In some embodiments, the second density is twice as large as the first density.

In some embodiments, the difference ratio between each second simulated stress and a corresponding first simulated stress is a ratio of an absolute value of a difference between the second simulated stress and the first simulated stress to the second simulated stress; and the threshold value is 3%.

In some embodiments, the analysis region is a rectangular region having a first side and a third side parallel to an X direction, and a second side and a fourth side parallel to a Y direction, a length of the first side and the third side is $L_1$, and a length of the second side and the fourth side is $L_2$; and the X direction is perpendicular to the Y direction.

In some embodiments, $L_1$ is in a range of 0.001 mm to 0.5 mm; and $L_2$ is in a range of 0.001 mm to 0.5 mm.

In some embodiments, the simulated boundary conditions include a first boundary condition and a second boundary condition. The first boundary condition is that: the first side, the third side, and the fourth side of the analysis region are fixed, and the second side is displaced by a product of $C_1$ and $L_1$ along the X direction away from the fourth side; under the first boundary condition, a first simulated stress at the second side along the X direction is $\sigma_{X1}$, and a first simulated stress at the third side along the Y direction is $\sigma_{Y1}$. The second boundary condition is that: the first side, the second side, and the fourth side are fixed, and the third side is displaced by a product of $C_2$ and $L_2$ along the Y direction away from the first side; under the second boundary condition, a first simulated stress at the second side along the X direction is $\sigma_{X2}$, and a first simulated stress at the third side along the Y direction is $\sigma_{Y2}$. $C_1$ and $C_2$ are strains of the planar model in corresponding directions.

In some embodiments, the equivalent mechanical parameters include an equivalent elastic modulus $E_X$ and an equivalent Poisson's ratio $V_{XY}$ in the X direction, and an equivalent elastic modulus $E_Y$ and an equivalent Poisson's ratio $V_{YX}$ in the Y direction, which are calculated by the following formulas:

$$\begin{bmatrix} E_X \\ E_Y \\ V_{XY} \\ V_{YX} \end{bmatrix} = \begin{bmatrix} \dfrac{\sigma_{X1} \times \sigma_{Y2} - \sigma_{Y1} \times \sigma_{X2}}{\sigma_{Y2} \times C_1} \\ \dfrac{\sigma_{X1} \times \sigma_{Y2} - \sigma_{Y1} \times \sigma_{X2}}{\sigma_{X1} \times C_2} \\ \dfrac{C_1 \times \sigma_{X2}}{C_2 \times \sigma_{X1}} \\ \dfrac{C_2 \times \sigma_{Y1}}{C_1 \times \sigma_{Y2}} \end{bmatrix}.$$

In some embodiments, $C_1$ is in a range of 0.0001 to 0.005, and $C_2$ is in a range of 0.0001 to 0.005.

In some embodiments, each grid obtained from the grid division is a square with a side length in a range of 0.003 mm to 0.02 mm.

In some embodiments, the actual mechanical parameters of the film layer material are actual mechanical parameters of the film layer material at a specified temperature.

Another aspect of the present disclosure provides a terminal, which includes: a display; a memory configured to store computer program codes, the computer program codes containing computer instructions; and one or more processors coupled to the display and the memory, the one or more processors being configured in a way that when the one or more processors execute the computer instructions, the terminal performs the method for calculating equivalent mechanical parameters of a film layer etching region as described above.

Yet another aspect of the present disclosure provides an apparatus for calculating equivalent mechanical parameters of a film layer etching region, and the apparatus includes an input interface and a processor coupled to the input interface. The input interface is configured to receive actual mechanical parameters of a film layer material input by a user. The processor is configured to: select at least a portion of the film layer etching region as an analysis region; establish a planar model corresponding to the analysis region; perform grid division on the planar model at a first density; analyze, by means of a finite element method, simulated stresses of the planar model under simulated boundary conditions according to the actual mechanical parameters of a film layer material and a current grid division; and calculate equivalent mechanical parameters of the analysis region according to the simulated stresses so as to obtain equivalent mechanical parameters of etching region. Under the simulated boundary conditions, the equivalent mechanical parameters enable an anisotropic planar blind plate having a same size as that of a boundary of the planar model to reach the simulated stresses.

In some embodiments, the processor is further configured to: perform grid division on the planar model at a second density, wherein the second density is different from the first density; analyze, by means of the finite element method, second simulated stresses of the planar model under the simulated boundary conditions according to the actual mechanical parameters of the film layer material and grid division at the second density; and compare whether a difference ratio between each second simulated stress and a corresponding first simulated stress exceeds a threshold value; if yes, returning to the step of performing grid division on the planar model at a first density and reselecting a larger first density; if no, proceeding to a next step.

In some embodiments, the difference ratio between each second simulated stress and a corresponding first simulated stress is a ratio of an absolute value of a difference between the second simulated stress and the first simulated stress to the second simulated stress; and the threshold value is 3%

In some embodiments, the analysis region is a rectangular region having a first side and a third side parallel to an X direction, and a second side and a fourth side parallel to a Y direction; a length of the first side and the third side is $L_1$, and a length of the second side and the fourth side is $L_2$; and the X direction is perpendicular to the Y direction.

In some embodiments, the simulated boundary conditions include a first boundary condition and a second boundary condition. The first boundary condition is that: the first side, the third side, and the fourth side of the analysis region are fixed, and the second side is displaced by a product of $C_1$ and $L_1$ along the X direction away from the fourth side; under the first boundary condition, a simulated stress at the second side along the X direction is $\sigma_{X1}$, and a simulated stress at the third side along the Y direction is $\sigma_{Y1}$. The second boundary condition is that: the first side, the second side, and the fourth side are fixed, and the third side is displaced by a product of $C_2$ and $L_2$ along the Y direction away from the first side; under the second boundary condition, a simulated stress at the second side along the X direction is $\sigma_{X2}$, and a simulated stress at the third side along the Y direction is $\sigma_{Y2}$.

The equivalent mechanical parameters include an equivalent elastic modulus $E_X$ and an equivalent Poisson's ratio $V_{XY}$ in the X direction, and an equivalent elastic modulus $E_Y$ and an equivalent Poisson's ratio $V_{YX}$ in the Y direction, which are calculated by the following formulas:

$$\begin{bmatrix} E_X \\ E_Y \\ V_{XY} \\ V_{YX} \end{bmatrix} = \begin{bmatrix} \dfrac{\sigma_{X1} \times \sigma_{Y2} - \sigma_{Y1} \times \sigma_{X2}}{\sigma_{Y2} \times C_1} \\ \dfrac{\sigma_{X1} \times \sigma_{Y2} - \sigma_{Y1} \times \sigma_{X2}}{\sigma_{X1} \times C_2} \\ \dfrac{C_1 \times \sigma_{X2}}{C_2 \times \sigma_{X1}} \\ \dfrac{C_2 \times \sigma_{Y1}}{C_1 \times \sigma_{Y2}} \end{bmatrix}.$$

In some embodiments, the actual mechanical parameters of the film layer material are actual mechanical parameters of the film layer material at a specified temperature.

Yet another aspect of the present disclosure provides non-transitory computer-readable storage medium storing executable instructions that, when executed by a terminal, cause the terminal to perform the method for calculating equivalent mechanical parameters of a film layer etching region as described above.

DETAILED DESCRIPTION

Figure 1:
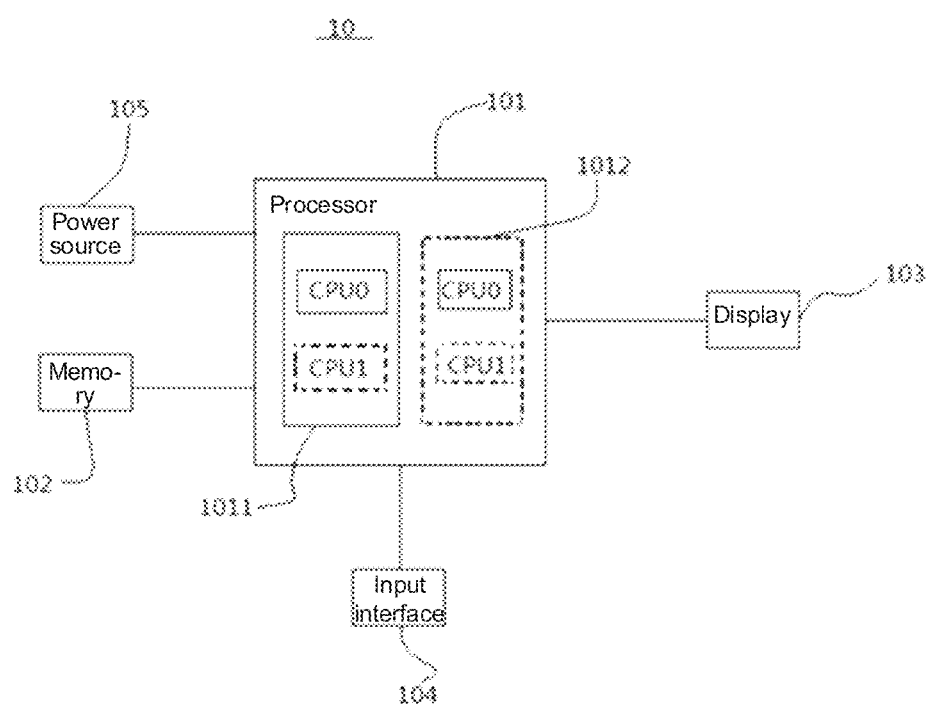
FIG. 1 is a schematic diagram showing a hardware structure of a terminal according to some embodiments of the present disclosure.

In order to make those skilled in the art better understand the technical solutions of the present disclosure, the present disclosure will be further described in detail below in conjunction with the accompanying drawings and specific embodiments.

One method for calculating stress distribution and deformation of an etching region is to establish a three-dimensional model for the etching region, and then calculate the stress distribution and deformation by using a finite element method according to actual mechanical parameters of material(s) of the film layer(s). However, due to a complicated structure of the three-dimensional model, in a case where the finite element method is used to calculate the stress distribution and deformation, model establishment and grid division of the three-dimensional model are very complicated, time-consuming, and unpractical.

Therefore, in order to simplify a process of calculating the stress and deformation of the etching region, the etching region is considered to be equivalent to an anisotropic planar blind plate (i.e., a complete two-dimensional plate with different mechanical properties in all directions, no thickness, and no opening), and then a planar model corresponding to the planar blind plate is established. Then the stress distribution and deformation are calculated by using the finite element method according to equivalent mechanical parameters corresponding to the planar model. The equivalent mechanical parameters refer to, in a case where an etching region is considered to be equivalent to the planar blind plate having different properties in all directions, equivalent Poisson's ratios and equivalent elastic moduli of the planar blind plate in all directions.

However, although calculation of the method for calculating the stress distribution and deformation by using the equivalent mechanical parameters is simple, since an actual etching region (a three-dimensional model formed after model establishment) is not a planar blind plate (a planar model formed after model establishment), the equivalent mechanical parameters are inevitably different from the actual mechanical parameters.

Only by using accurate equivalent mechanical parameters can the actual stress distribution and deformation of the etching region be infinitely approached. Methods for obtaining accurate equivalent mechanical parameters include an experimental method and a theoretical method. The experimental method refers to manufacturing a standard sample product and performing tests on the standard sample product. However, due to process limitations, it is usually difficult to obtain standard samples, which will also cause an increase in cost and time. The theoretical method refers to obtaining the equivalent mechanical parameters through theoretical calculation. However, this method is only applicable to a regular etching region, and is not applicable to various kinds of irregular etching regions.

Based on this, some embodiments of the present disclosure provide a method and an apparatus for calculating equivalent mechanical parameters of an etching region of film layer(s).

In order to facilitate understanding of the technical solutions of some embodiments of the present disclosure, a brief introduction of related technical terms is given in advance.

The term "finite element method", also known as finite element analysis (FEA), refers to a method that uses mathematical approximations to simulate a real physical system (geometry and load conditions). Commonly used FEA systems include ansys, abaqus, msc, and comsol.

The term "etching region" refers to a region having etched opening(s) (a pattern) in film layer(s) of a substrate (such as a display substrate).

The term "analysis region" refers to a portion of or all of the etching region of the film layer(s), and the portion of or all of the etching region is selected as an analysis object of the finite element method.

The term "simulated boundary conditions" refer to conditions that are imposed on a boundary of a planar model, to which the analysis region is equivalent, to constrain a degree of freedom of motion of the planar model. For example, one side of the planar model is displaced in an X or an Y direction, while other sides are fixed.

The term "equivalent mechanical parameters" refer to mechanical parameters that enable an anisotropic planar blind plate (i.e., a complete two-dimensional plate with different mechanical properties in all directions, no thickness, and no opening) to exhibit a same mechanical behavior as an actual etching region in a case where the etching region is considered to be equivalent to the planar blind plate. For example, the equivalent mechanical parameters may include equivalent elastic moduli and equivalent Poisson's ratios.

The term "equivalent Poisson's ratio $V_{XY}$ in the X direction" refers to a ratio of a strain generated in the Y direction (perpendicular to the X direction) to a strain generated in the X direction when a material is subjected to a stress in the X direction.

The term "equivalent Poisson's ratio $V_{XY}$ in the Y direction" refers to a ratio of a strain generated in the X direction (perpendicular to the Y direction) to a strain generated in the Y direction when the material is subjected to a stress in the Y direction.

In some embodiments of the present disclosure, unless otherwise specified, "a plurality of" refers to two or more than two, and "and/or" merely describes an association of associated objects, which include three situations. For example, "A and/or B" refers to three situations: A alone, A and B, and B alone. Terms "first", "second" and "third" are used to distinguish between same or similar items whose functions and effects are substantially the same. A person skilled in the art will understand that the terms "first", "second" and "third" are not intended to limit a quantity and order of execution of the items, and do not limit a difference among the items.

The method for calculating equivalent mechanical parameters of an etching region of film layer(s) provided in some embodiments of the present disclosure is applied to a terminal. For example, the terminal can perform the method for calculating equivalent mechanical parameters of an etching region of film layer(s). The terminal includes, but is not limited to, a computer, a mobile phone, a tablet computer, and a high-equipped server.

Some embodiments of the present disclosure use a computer as an example to illustrate how the terminal implements the technical solutions of the embodiments of the present disclosure. FIG. 1 is a schematic diagram showing a hardware structure of the terminal. The terminal includes, but is not limited to, components shown in FIG. 1. The various components shown in FIG. 1 may be implemented in hardware, software, or a combination of hardware and software, which includes one or more data processing and/or application-specific integrated circuits.

As shown in FIG. 1, the terminal 10 (e.g., a computer) includes one or more processors 101, a memory 102, a display 103, an input interface 104, and a power source 105.

The one or more processors 101 are a general-purpose central processing unit (CPU), a microprocessor, an application-specific integrated circuit (ASIC), or one or more integrated circuits used for controlling execution of a program of embodiments of the present disclosure. For example, each of a processor 1011 and a processor 1012 in FIG. 1 is a single-CPU or a multi-CPU. Moreover, one processor includes one or more CPUs, such as CPU0 and CPU1 shown in FIG. 1.

The memory 102 is configured to store software programs and data, and the processor 101 processes information by running the software programs and data stored in the memory 102. The memory 102 includes, but is not limited to, a read-only memory (ROM), a random access memory (RAM), an electrically erasable programmable read-only memory (EEPROM), a compact disc read-only memory (CD-ROM), an optical disc storage (including a compact disc, a laser disc, an optical disc, a digital versatile disc, and a Blu-ray disc), a disk storage media, and the like.

The display 103 is configured to display information input by the user or information provided to the user. The display 103 may be implemented in the form of a liquid crystal display (LCD), an organic light-emitting diode (OLED), or the like.

The input interface 104 is configured to receive numerical or character information input by the user.

The power source 105 is configured to supply power to various other components of the terminal 10.

The method for calculating equivalent mechanical parameters of an etching region of film layer(s) described below may be implemented in the terminal 10 having the hardware structure described above.

As shown in FIGS. 2a to 9, some embodiments of the present disclosure provide a method for calculating equivalent mechanical parameters of an etching region of film layer(s). The calculation method includes the following steps 21-27 (S21-S27).

In S21, at least a portion of the etching region of the film layer(s) is selected as an analysis region.

That is, a portion of or all of the etching region, such as a tiny etching region, which has opening(s), of the film layer(s) is selected as the analysis object of subsequent steps.

If an entire etching region is selected as an analysis region, equivalent mechanical parameters corresponding to the entire etching region may be obtained.

If the etching region is divided into a plurality of analysis regions and each analysis region has a different situation about the opening, different equivalent mechanical parameters of the analysis regions may be obtained. The etching region may be considered to be formed by splicing a plurality of different planar blind plates.

Figure 3:
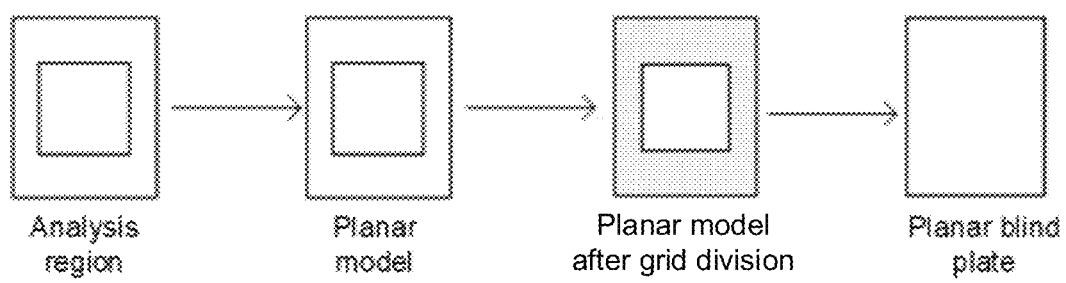
FIG. 3 is a schematic diagram showing a process of obtaining a planar blind plate from an analysis region in a method according to some embodiments of the present disclosure.
Figure 7:
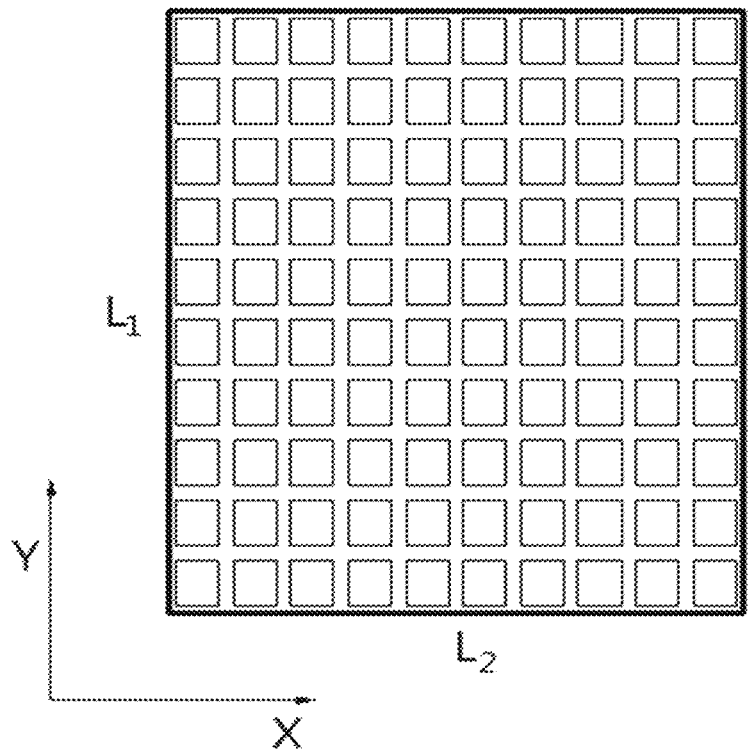
FIG. 7 is a schematic diagram showing an etching region according to some embodiments of the present disclosure.

If the etching region, as shown in FIG. 7, is composed of a plurality of analysis regions shown in FIG. 3 arranged in an array, the equivalent mechanical parameters calculated based on the analysis region shown in FIG. 3 are equal to equivalent mechanical parameters calculated based on the entire etching region shown in FIG. 7 that is selected as the analysis region.

Figure 4:
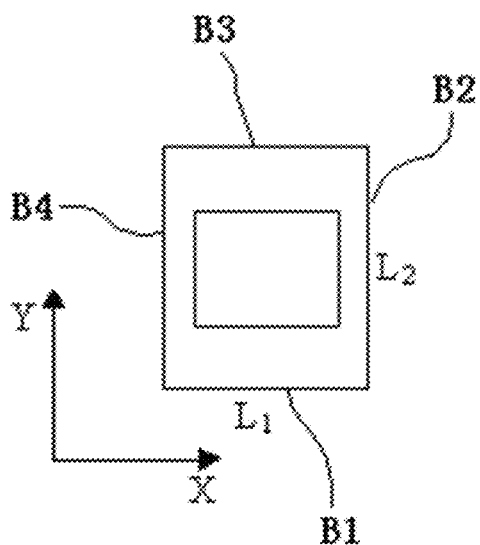
FIG. 4 is a schematic diagram showing an analysis region according to some embodiments of the present disclosure.

In some embodiments of the present disclosure, the analysis region is a rectangular region, for example, a rectangular region or a square region. Referring to FIG. 4, the analysis region is a rectangular region having a first side B1 and a third side B3 parallel to the X direction, and a second side B2 and a fourth side B4 parallel to the Y direction. A length of the first side B1 and the third side B3 is $L_1$, and a length of the second side B2 and the fourth side B4 is $L_2$.

That is, as shown in FIG. 3, a rectangular region is selected as the analysis region (therefore a planar blind plate obtained subsequently also has a rectangular shape). In this case, the analysis region has a regular shape, which is conducive for calculation. As shown in FIG. 4, since the analysis region has a rectangular shape, the X direction and Y direction are perpendicular to each other, and $L_1$ and $L_2$ are unequal (for example, in FIG. 4, $L_2$ is longer than $L_1$).

Of course, the above description only defines that an overall shape of the analysis region is a rectangle, but a shape, position, number, and size of opening(s) in the analysis region may be irregular. Therefore, the method provided in some embodiments of the present disclosure is applicable to irregular etching regions.

In some embodiments of the present disclosure, the length $L_1$ of the first side B1 and the third side B3 is in a range of 0.001 mm to 0.5 mm, and the length $L_2$ of the second side B2 and the fourth side B4 is in a range of 0.001 mm to 0.5 mm.

If the analysis region is too large, there will be many grids after grid division, which will make calculation of the finite element method more difficult. If the analysis region is too small, it is often necessary to divide the etching region into many analysis regions, which also makes calculation more difficult. Therefore, a size of the analysis region is within the above range.

In S22, a planar model corresponding to the analysis region is established.

As shown in FIG. 3, a planar model is set up for the analysis region. That is, the analysis region is converted into a two-dimensional plate model having a same boundary size and same opening(s) at same position(s) as the analysis region but no thickness (such as a Plane 42 model, which is a planar model in the model library of the FEA system ansys used for analyzing the mechanical phenomena of planar structures). The planar model is used as an analysis object of the finite element method.

In S23, grid division is performed on the planar model at a first density.

As shown in FIG. 3, grid division is performed on the established planar model at a specific first density. Obviously, grid division is only performed on a solid portion of the planar model (the portion except for the opening(s)), and not performed on the opening(s).

In some embodiments of the present disclosure, a grid is a square with a side length in a range of 0.003 mm to 0.02 mm.

A shape of grids in the planar model is usually a square. The higher the density of the grids is (the smaller the size of the square is), the more accurate the calculation results will be, but also the greater the computational effort it will require. It has been found through research that grids each in the above size range can achieve higher accuracy with relatively less computational effort.

In S24, first simulated stresses of the planar model under simulated boundary conditions are analyzed, by means of the finite element method, according to actual mechanical parameters of material(s) of the film layer(s) and the grid division at the first density.

This step is to calculate the stresses suffered by the planar model under specific boundary conditions (constraints) by means of the finite element method according to the actual mechanical parameters of material(s) of the film layer(s) (actual mechanical parameters of a three-dimensional macroscopic material, which are already known). For example, the actual mechanical parameters of material(s) include actual Poisson's ratios and actual elastic moduli of the material(s) in all directions. That is, it is assumed that a planar plate having a same shape and size as the planar model but with no thickness is deformed in a certain way, and then a stress generated under this deformation is calculated by the finite element method. The calculated stress is regarded as the first simulated stress.

In some embodiments of the present disclosure, the actual mechanical parameters of the material(s) of the film layer(s) are actual mechanical parameters of the material(s) of the film layer(s) at a specified temperature.

That is, when equivalent mechanical parameters at different temperatures are calculated, the actual mechanical parameters of the material(s) used to calculate the first simulated stresses in this step should also be actual mechanical parameters of the material(s) at corresponding temperatures. Therefore, in the method provided in this embodiment, an influence of temperature may be taken into account, so as to obtain more accurate equivalent mechanical parameters.

Figure 5:
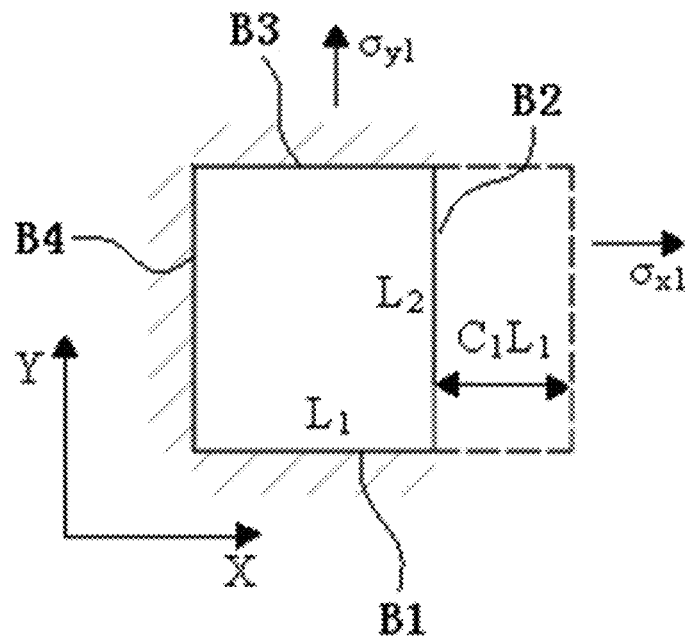
FIG. 5 is a schematic diagram showing a state of a planar model under a first boundary condition according to some embodiments of the present disclosure.

In some embodiments of the present disclosure, referring to FIG. 5, the first boundary condition is that: the first side B1, the third side B3, and the fourth side B4 are fixed, and the second side B2 is displaced by a product of $C_1$ and $L_1$ ($C_1L_1$) along the X direction away from the fourth side B4. Under the first boundary condition, a stress at the second side B2 along the X direction is $\sigma_{X1}$, and a stress at the third side B3 along the Y direction is $\sigma_{Y1}$.

Figure 6:
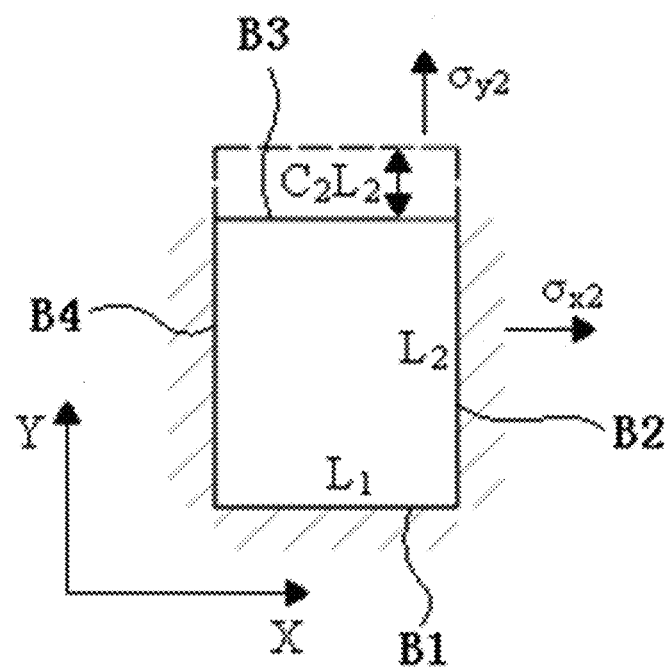
FIG. 6 is a schematic diagram showing a state of a planar model under a second boundary condition according to some embodiments of the present disclosure.

Referring to FIG. 6, the second boundary condition is that: the first side B1, the second side B2, and the fourth side B4 are fixed, and the third side B3 is displaced by a product of $C_2$ and $L_2$ ($C_2L_2$) along the Y direction away from the first side B1. Under the second boundary condition, the stress at the second side B2 along the X direction is $\sigma_{X2}$, and the stress at the third side B3 along the Y direction is $\sigma_{Y2}$.

That is to say, two different boundary conditions may be set. The first boundary condition is that three sides are fixed, and one side having the length $L_2$ is displaced along the X direction. In this case, stresses of the planar model in the X direction and the Y direction calculated by using the finite element method are $\sigma_{X1}$ and $\sigma_{Y1}$ respectively. The second boundary condition is that three sides are fixed, and one side having the length $L_1$ is displaced along the Y direction. In this case, the stresses of the planar model in the X direction and the Y direction calculated by the finite element method are $\sigma_{X2}$ and $\sigma_{Y2}$ respectively.

$C_1$ and $C_2$ are strains of the planar model in corresponding directions, and may be artificially set as needed. In some embodiments of the present disclosure, strain $C_1$ is in a range of 0.0001 to 0.005, and strain $C_2$ is in a range of 0.0001 to 0.005. This is because in the above small strain ranges, most materials are elastically deformed, and thus calculation results of the finite element method are more consistent with actual measurements.

In S25, grid division is performed on the planar model at a second density which is different from the first density, and a second simulated stress of the planar model under the simulated boundary conditions is analyzed, by means of the finite element method, according to actual mechanical parameters of the material(s) of the film layer(s) and the grid division at the second density.

The second density is different from the first density. Generally, the second density is greater than the first density. For example, the second density is twice as large as the first density.

As described above, the grid division affects the calculation results. Therefore, in order to ensure that the grid division is suitable, after obtaining a certain simulated stress (the first simulated stress) through calculation on the basis of the grid division at the first density, a second density twice as large as the first density (a number of grids in an area is twice as large as a number of grids in a same area at the first density) may be selected to perform grid division to calculate the simulated stress (the second simulated stress).

In S26, each second simulated stress and a corresponding first simulated stresses are compared to determine whether a difference ratio between the second simulated stress and the first simulated stresses exceeds a threshold value. If yes, return to step S23 and reselect a larger first density; if no, proceed to a next step.

Figure 2A:
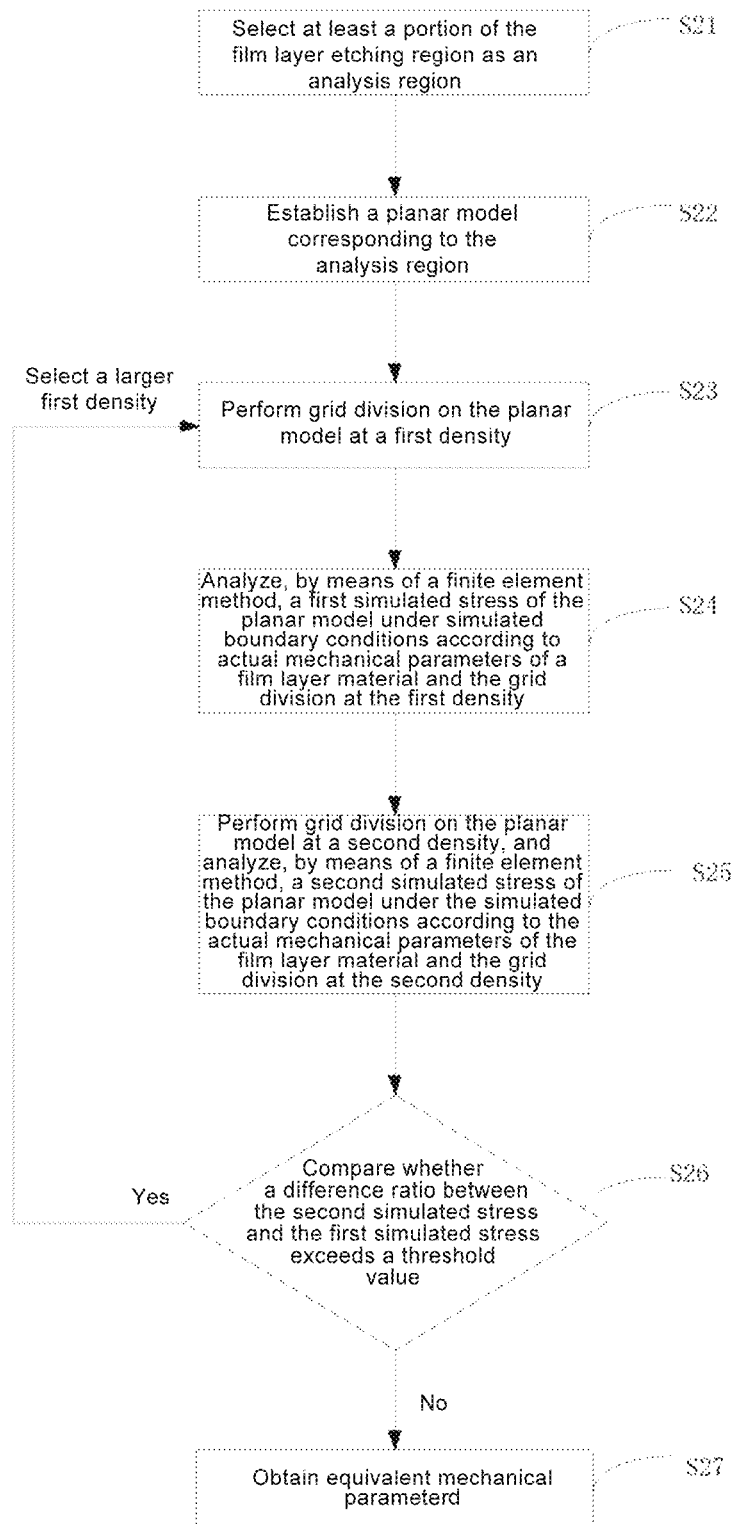
FIG. 2a is a flow diagram of a method for calculating equivalent mechanical parameters of an etching region of film layer(s) according to some embodiments of the present disclosure.

The first simulated stress and the second simulated stress are compared. If the difference ratio between the two exceeds a predetermined value (i.e., the threshold value), the first density is considered to be too small that the calculation results are not accurate enough. In this case, return to step S23 and reselect a larger first density. Next, as shown in FIG. 2a, a larger second density that is twice of the reselected first density is reselected in S25, to recalculate the results in S26.

In some embodiments of the present disclosure, the difference ratio between the second simulated stress and the first simulated stresses is a ratio of an absolute value of a difference between the second simulated stress and the first simulated stresses to the second simulated stress. The threshold value is 3%.

That is to say, in a case where the second simulated stress is specified as 100%, if the first simulated stress exceeds 103% or is less than 97%, then the difference between the two is considered to be too large, and it is necessary to return to step S23.

In S27, equivalent mechanical parameters are calculated. Under the simulated boundary conditions, the equivalent mechanical parameters enable an anisotropic planar blind plate having a same boundary size as that of the planar model to reach the first simulated stress.

In this step, the planar model is conceptually (without actual operation) considered to be equivalent to an anisotropic planar blind plate with no opening and no thickness, and the equivalent mechanical parameters corresponding to the planar blind plate are calculated. The planar blind plate should correspond to such equivalent mechanical parameters: the parameters enable the planar blind plate to be subjected to a same stress (the first simulated stress) under a same boundary condition (the simulated boundary condition); or, the parameters enable the planar blind plate to be subjected to the first simulated stresses under the simulated boundary conditions, and the mechanical parameters of the planar blind plate are calculated through backward reasoning and are regarded as equivalent mechanical parameters.

The equivalent mechanical parameters to be calculated may include an equivalent elastic modulus $E_X$ and an equivalent Poisson's ratio $V_{XY}$ in the X direction, and an equivalent elastic modulus $E_Y$ and an equivalent Poisson's ratio $V_{YX}$ in the Y direction.

As described above, under the first boundary condition, the strains of the planar model in the X direction and the Y direction are $C_1$ and 0 respectively, and the stresses in the X direction and the Y direction are $\sigma_{X1}$ and $\sigma_{Y1}$ respectively.

Therefore, in the planar blind plate shown in FIG. 5, the stresses in the X direction and the Y direction are $\sigma_{X1}$ and $\sigma_{Y1}$ respectively, and the strains in the X direction and the Y direction are $C_1$ and 0 respectively. Thus, the equivalent mechanical parameters corresponding to the planar blind plate should satisfy the following equations:

$$\frac{\sigma_{X1}}{E_X} - \frac{\sigma_{Y1}}{E_Y}V_{YX} = C_1; \qquad \text{Equation 1}$$

-continued $$\frac{\sigma_{Y1}}{E_Y} - \frac{\sigma_{X1}}{E_X} V_{XY} = 0. \quad \text{Equation 2}$$

Similarly, according to the second boundary condition, the following equations may be obtained:

$$\frac{\sigma_{X2}}{E_X} - \frac{\sigma_{Y2}}{E_Y} V_{YX} = 0; \quad \text{Equation 3}$$

$$\frac{\sigma_{Y2}}{E_Y} - \frac{\sigma_{X2}}{E_X} V_{XY} = C_2. \quad \text{Equation 4}$$

Combining Equations 1-4, the following equation may be obtained:

$$\begin{bmatrix} \sigma_{X1} & 0 & 0 & -\sigma_{Y1} \\ 0 & \sigma_{Y1} & -\sigma_{X1} & 0 \\ \sigma_{X2} & 0 & 0 & -\sigma_{Y2} \\ 0 & \sigma_{Y2} & -\sigma_{X2} & 0 \end{bmatrix} \times \begin{bmatrix} \frac{1}{E_X} \\ \frac{1}{E_Y} \\ \frac{V_{XY}}{E_X} \\ \frac{V_{YX}}{E_Y} \end{bmatrix} = \begin{bmatrix} C_1 \\ 0 \\ 0 \\ C_2 \end{bmatrix}. \quad \text{Equation 5}$$

Solving Equation 5, it can be seen that the equivalent mechanical parameters may be calculated by the following equation:

$$\begin{bmatrix} E_X \\ E_Y \\ V_{XY} \\ V_{YX} \end{bmatrix} = \begin{bmatrix} \frac{\sigma_{X1} \times \sigma_{Y2} - \sigma_{Y1} \times \sigma_{X2}}{\sigma_{Y2} \times C_1} \\ \frac{\sigma_{X1} \times \sigma_{Y2} - \sigma_{Y1} \times \sigma_{X2}}{\sigma_{X1} \times C_2} \\ \frac{C_1 \times \sigma_{X2}}{C_2 \times \sigma_{X1}} \\ \frac{C_2 \times \sigma_{Y1}}{C_1 \times \sigma_{Y2}} \end{bmatrix}. \quad \text{Equation 6}$$

It can be seen that the equivalent mechanical parameters of the analysis region (which is the entire etching region or a portion of the etching region) may be calculated through Equation 6. In this calculation method, the simulated boundary conditions are very simple, therefore the required computational effort is less and the required time is short. Therefore the method is easy to be implemented. Moreover, in a process of calculating the stress distribution and deformation of the etching region, a combined action of the Poisson's ratio and the elastic modulus is taken into account. Therefore, the calculation results are accurate and the error is small.

Several variations of the above method for calculating equivalent mechanical parameters of the etching region of film layer(s) are described below.

Variation 1:

Referring to FIG. 2a, the second density is less than the first density (for example, the second density is half of the first density), after obtaining the first simulated stresses through calculation on the basis of the grid division at the first density, the second density half of the first density, for example, may be used to perform grid division to calculate the second simulated stresses.

Each first simulated stress and a corresponding second simulated stress are compared. If the difference ratio between the two exceeds the threshold value, then the first density is considered to be too small that the calculation results are not accurate enough, and it is necessary to return to S23 to select a larger first density to recalculate the result, and then to select a larger second density that is half of the reselected first density to recalculate a result in S25, as shown in FIG. 2a. If the difference ratio between the two does not exceed the threshold value, then proceed to S27.

Although the equivalent mechanical parameters calculated on the basis of the grid division at the first density are obtained in both this variation and the above method, in this variation, the equivalent mechanical parameters are obtained according to a larger density of the first density and the second density. However, in the above method, the equivalent mechanical parameters are obtained according to a smaller density of the first density and the second density. In this case, since the difference ratio between each first simulated stress and a corresponding second simulated stress is less than the threshold value (such as 3%), which means the difference is small, the simulated stresses corresponding to any one of the first density or the second density may be selected to calculate the equivalent mechanical parameters.

Figure 2B:
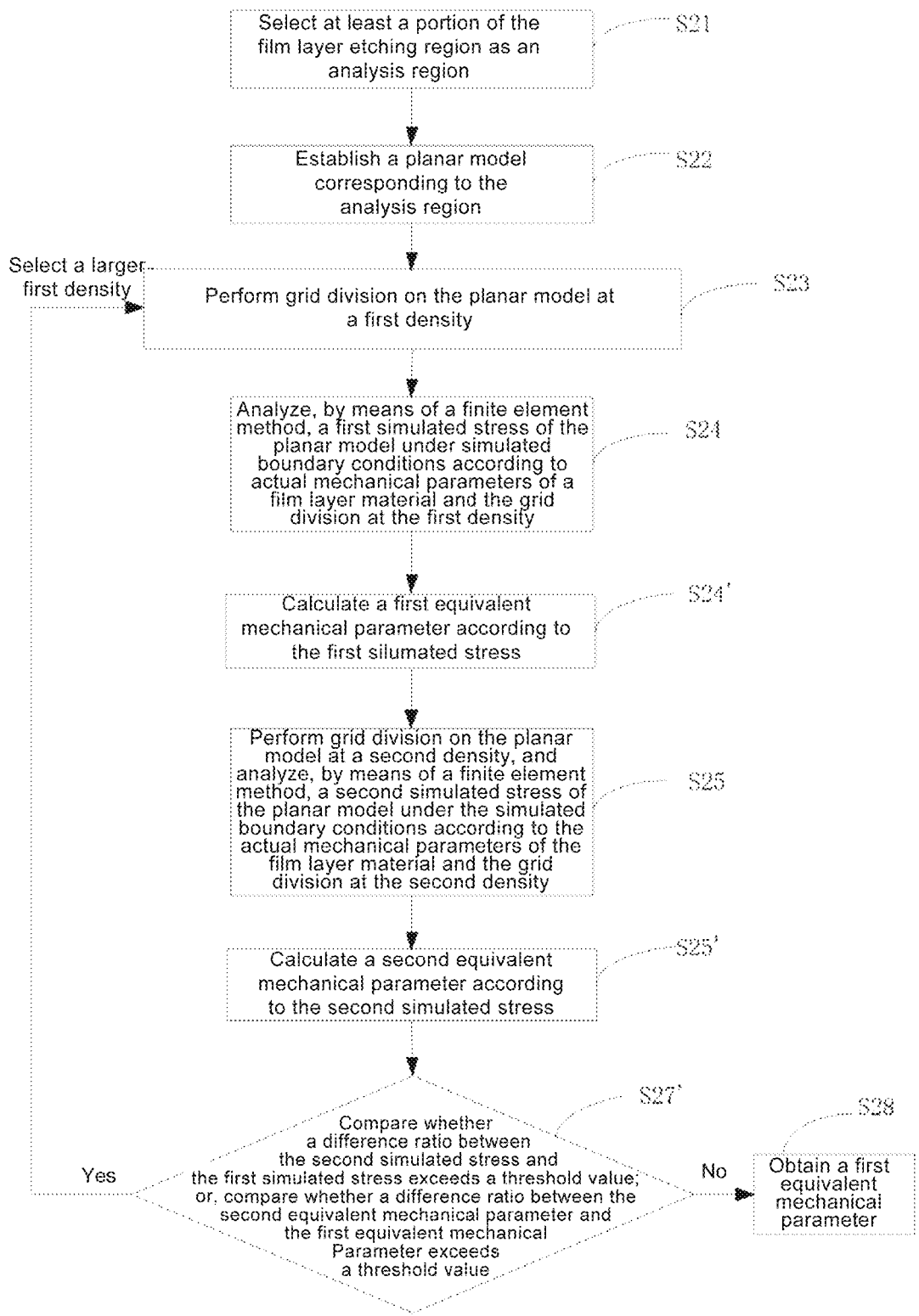
FIG. 2b is another flow diagram of a method for calculating equivalent mechanical parameters of an etching region of film layer(s) according to some embodiments of the present disclosure.

Variation 2:

In FIG. 2b, S21-S25 are the same as in FIG. 2a, and the difference lies in S24', S25', S27' and S28.

In FIG. 2b, first, the first simulated stresses are obtained in S24, and first equivalent mechanical parameters are calculated according to the first simulated stresses in S24'. After that, the second simulated stresses are obtained in S25, and second equivalent mechanical parameters are calculated according to the second simulated stresses in S25'.

Next, the second simulated stresses and the first simulated stresses are compared in S27' to determine whether a difference ratio between each second simulated stress and a corresponding first simulated stress exceeds the threshold value; or, a second equivalent mechanical parameter and a first equivalent mechanical parameter are compared in S27' to determine whether a difference ratio between the second equivalent mechanical parameter and the first equivalent mechanical parameter exceeds the threshold value.

The difference ratio between the second simulated stress and the first simulated stress is: a ratio of an absolute value of a difference between the second simulated stress and the first simulated stress to the second simulated stress. Similarly, the difference ratio between the second equivalent mechanical parameter and the first equivalent mechanical parameter is: a ratio of an absolute value of a difference between the second equivalent mechanical parameter and the first equivalent mechanical parameter to the second equivalent mechanical parameter. The threshold value is, for example, 3%.

If yes, return to S23 and select a larger first density. If no, a first equivalent mechanical parameter is obtained in S28. The first equivalent mechanical parameter is the equivalent mechanical parameter calculated in S27 by the method shown in FIG. 2a.

It will be noted that an order of steps in the methods shown in FIG. 2a and FIG. 2b is only an example, and a person skilled in the art may adjust the order according to actual conditions.

Verifications of the method for calculating equivalent mechanical parameters of a film layer etching region provided by some embodiments of the present disclosure are as follows.

Verification 1:

An actual product having the etching region shown in FIG. 7 is fabricated, and the shape of the etching region is a rectangle having sides which have a length of $L_1$=100 mm and a length of $L_2$=60 mm respectively (but it is not limited thereto, and the shape of the etching region may also be a square). A thickness of the film layer is 0.03 mm, and the material of the film layer is SUS304 (i.e., 304 stainless steel). There are a plurality of square openings arranged in a matrix in the etching region. A side length of each opening is 0.05 mm, and a spacing between adjacent openings is 0.05 mm in both the X direction and Y direction.

Three sides of the etching region are constrained, and a side having a length $L_1$ is displaced by different amounts in the X direction, so as to measure the actual stress along the X direction. In addition, the first simulated stress along the X direction under the simulated boundary condition is calculated according to the method provided in some embodiments of the present disclosure (the grid is in the shape of a square with a side length of 0.025 mm). Specific results of the measured stress and the first simulated stress are shown in the table below.

| Strain | Measured stress (MPa) | First simulated stress (MPa) | Difference ratio (%) |
| --- | --- | --- | --- |
| 0.01 | 4.73 | 4.8574 | 2.7 |
| 0.02 | 9.81 | 9.7148 | −0.97 |
| 0.03 | 14.85 | 14.5722 | −1.87 |
| 0.04 | 18.83 | 19.4296 | 3.2 |

It can be seen that the difference ratios between the measured stress and the first simulated stress are all very small (less than 4%) under different degrees of deformation. This indicates that the first simulated stress calculated by the method provided in some embodiments of the present disclosure is very close to the actual stress. Therefore, the equivalent mechanical parameters calculated according to the first simulated stress are highly accurate.

Verification 2:

The equivalent mechanical parameters of the etching region of Verification 1 with different side lengths of grids (the grids in the shape of a square) are obtained, and then the stress of the etching region when a strain of 0.01 occurs along the X direction in the etching region is calculated by using the finite element method according to the above equivalent mechanical parameters.

Specific results are shown in the table below.

| Side length of the grid (mm) | Calculated stress (MPa) |
| --- | --- |
| 0.02 | 5.2527 |
| 0.01 | 5.0891 |
| 0.005 | 4.9357 |
| 0.004 | 4.9127 |
| 0.003 | 4.8954 |

It can be seen that a difference ratio between the calculated stresses is less than 10% even when the side length of the grid is increased by nearly 1000% (from 0.003 mm to 0.02 mm). This indicates that a density range of the grids applicable to the method provided in some embodiments of the present disclosure is very large. Therefore, a low density of the grids may be selected, so as to significantly reduce calculation time and improve efficiency while ensuring accuracy.

Figure 8:
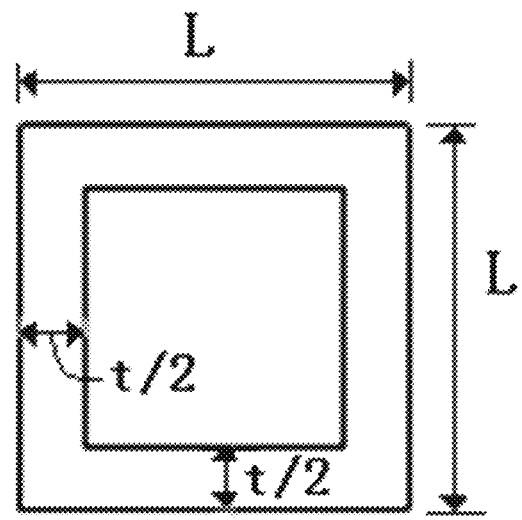
FIG. 8 is a schematic diagram showing another etching region according to some embodiments of the present disclosure.
Figure 9:
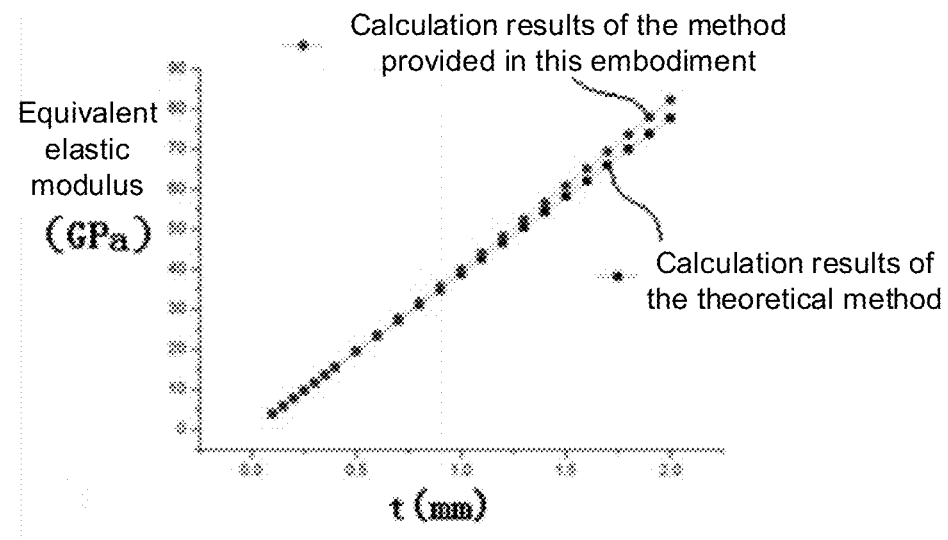
FIG. 9 is a comparison diagram of equivalent elastic moduli of the etching region shown in FIG. 8 obtained by using two methods.

Verification 3:

A square etching region with a side length of L=5 mm shown in FIG. 8 (but it is not limited thereto, the etching region may also be a rectangle) is selected. There is a square opening in a middle of the square etching region. A distance between the opening and edges of the square etching region is t/2. The actual elastic modulus of the film layer material is 194 GPa. The equivalent elastic modulus along the X direction of the square etching region under different t values (since the etching region is a square, the equivalent elastic moduli in the X direction and the Y direction are equal) is calculated by a theoretical method provided in a literature Wang A J, McDowell D L, In-planar stiffness and yield strength of periodic metal honeycombs, ASME. J. Eng. Mater. Tech. In addition, the equivalent elastic modulus along the X direction is calculated according to the method provided in some embodiments of the present disclosure (the grid is in the shape of a square with a side length of 0.025 mm). Specific results are shown in the following table and FIG. 9.

| t (mm) | Equivalent elastic modulus (GPa) calculated by the theoretical method | Equivalent elastic modulus (GPa) calculated by the method provided in embodiments of the present disclosure | Difference ratio between equivalent elastic moduli (%) |
| --- | --- | --- | --- |
| 0.1 | 3.88 | 3.89 | 0.26 |
| 0.3 | 11.64 | 11.74 | 0.86 |
| 0.6 | 23.28 | 23.68 | 1.72 |
| 0.9 | 34.92 | 35.835 | 2.62 |
| 1.2 | 46.56 | 48.206 | 3.54 |
| 1.5 | 58.2 | 60.791 | 4.45 |
| 1.8 | 69.84 | 73.6 | 5.38 |
| 2 | 77.6 | 82.278 | 6.03 |

It can be seen that the difference ratios between the equivalent elastic modulus calculated by the theoretical method and the equivalent elastic modulus calculated by the method provided in some embodiments of the present disclosure are all very small (less than 7%) at different t values. This indicates that the equivalent mechanical parameters calculated by the method provided in some embodiments of the present disclosure are very accurate.

In summary, in the method for calculating equivalent mechanical parameters of an etching region of film layer(s) provided in some embodiments of the present disclosure, the etching region is considered to be equivalent to an anisotropic planar blind plate. Actual mechanical parameters of the material (actual mechanical parameters of a three-dimensional macroscopic material) are used to calculate the first simulated stresses. Then the equivalent mechanical parameters are calculated according to the first simulated stresses through backward reasoning. Therefore, this method does not require fabrication of a standard sample product, and is easy to implement, cost-effective, and time-saving. The first simulated stresses are calculated by the finite element method, so the method is also applicable to an irregular etching region. Meanwhile, it is proved through experiments that the calculation process of this method is simple, and there is only a slight difference between the equivalent mechanical parameters obtained by this method and the equivalent mechanical parameters obtained by the existing methods. This indicates that the calculation results of this method are accurate. According to the obtained equivalent mechanical parameters, it is possible to calculate accurate actual stress distribution and deformation of the etching region, which may be used to design a reasonable etching region.

Figure 10:
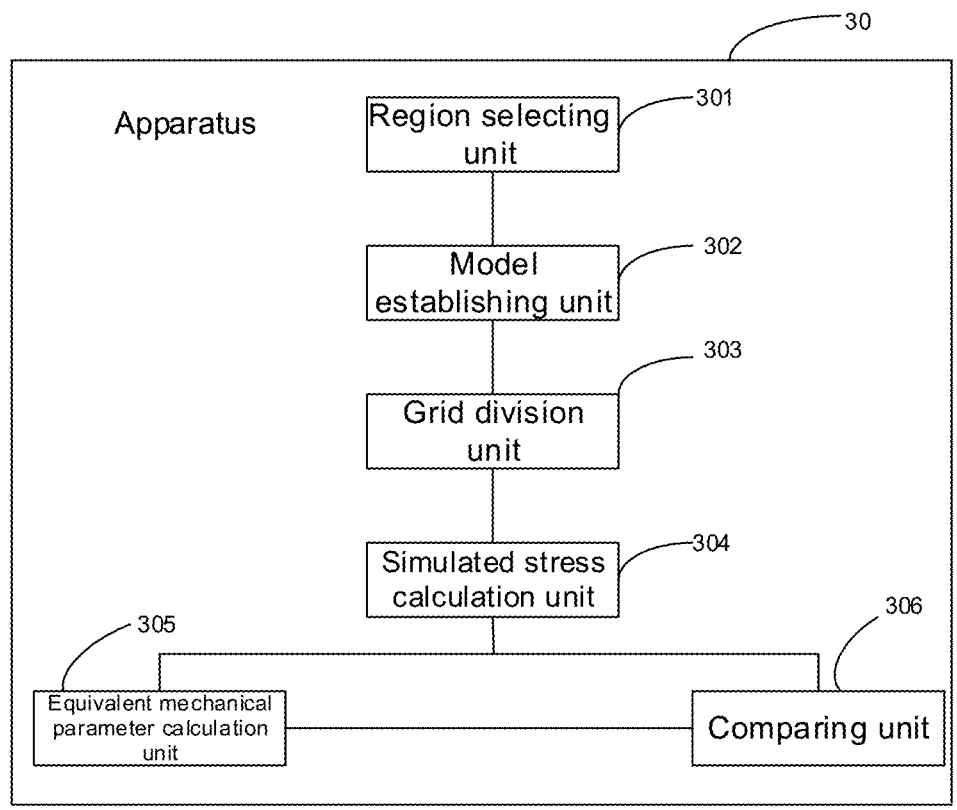
FIG. 10 is a schematic diagram showing an apparatus for calculating equivalent mechanical parameters of an etching region of film layer(s) according to some embodiments of the present disclosure.

In some embodiments of the present disclosure, the terminal that implements the foregoing method may be divided into functional modules according to the foregoing methods and examples. For example, the terminal may be divided in a way that each functional module corresponds to a function, or that two or more functions are integrated into one functional module. The above integrated functional modules may be implemented in the form of hardware or software function modules. It will be noted that division method of functional modules in some embodiments of the present disclosure is only illustrative, and is only a division method according to logical functions; and other division methods may be adopted in actual applications. For example, an apparatus for calculating equivalent mechanical parameters of an etching region of film layer(s) is provided in FIG. 10. The apparatus includes:

a region selection unit configured to select at least a portion of the etching region of film layer(s) as an analysis region;

a model establishing unit configured to establish a planar model corresponding to the analysis region;

a grid division unit configured to perform grid division on the planar model;

a simulated stress calculation unit configured to analyze, by means of a finite element method, simulated stresses of the planar model under simulated boundary conditions according to actual mechanical parameters of material(s) of film layer(s) and a current grid division; and an equivalent mechanical parameter calculation unit configured to calculate equivalent mechanical parameters, wherein under the simulated boundary conditions, the equivalent mechanical parameters enable an anisotropic planar blind plate having a same boundary size as that of the planar model to reach first simulated stresses.

In some embodiments of the present disclosure, the analysis region is a rectangular region having a first side and a third side parallel to an X direction, and a second side and a fourth side parallel to a Y direction. A length of the first side and the third side is $L_1$, and a length of the second side and the fourth side is $L_2$.

In some embodiments of the present disclosure, the simulated boundary conditions include a first boundary condition and a second boundary condition.

The first boundary condition is that: the first side, the third side, and the fourth side are fixed, and the second side is displaced by a product of $C_1$ and $L_1$ ($C_1L_1$) along the X direction away from the fourth side. Under the first boundary condition, a stress along the X direction is $\sigma_{X1}$, and a stress along the Y direction is $\sigma_{Y1}$.

The second boundary condition is that: the first side, the second side, and the fourth side are fixed, and the third side is displaced by a product of $C_2$ and $L_2$ ($C_2L_2$) along the Y direction away from the first side. Under the second boundary condition, the stress along the X direction is $\sigma_{X2}$, and the stress along the Y direction is $\sigma_{Y2}$.

The equivalent mechanical parameters include an equivalent elastic modulus $E_X$ and an equivalent Poisson's ratio $V_{XY}$ in the X direction, and an equivalent elastic modulus $E_Y$ and an equivalent Poisson's ratio $V_{YX}$ in the Y direction. These parameters may be calculated by the following equation:

$$\begin{bmatrix} E_X \\ E_Y \\ V_{XY} \\ V_{YX} \end{bmatrix} = \begin{bmatrix} \frac{\sigma_{X1} \times \sigma_{Y2} - \sigma_{Y1} \times \sigma_{X2}}{\sigma_{Y2} \times C_1} \\ \frac{\sigma_{X1} \times \sigma_{Y2} - \sigma_{Y1} \times \sigma_{X2}}{\sigma_{X1} \times C_2} \\ \frac{C_1 \times \sigma_{X2}}{C_2 \times \sigma_{X1}} \\ \frac{C_2 \times \sigma_{Y1}}{C_1 \times \sigma_{Y2}} \end{bmatrix} \quad \text{Equation 6}$$

In some embodiments of the present disclosure, the actual mechanical parameters of material(s) of the film layer(s) are actual mechanical parameters of the material(s) of the film layer(s) at a specified temperature.

In some embodiments of the present disclosure, the apparatus for calculating equivalent mechanical parameters of the etching region of the film layer(s) further includes:

a comparing unit configured to compare whether a difference ratio between each second simulated stress and a corresponding first simulated stress exceeds a threshold value. The first simulated stress is a simulated stress calculated by the simulated stress calculation unit under grid division at a first density, and the second simulated stress is a simulated stress calculated by the simulated stress calculation unit under grid division at a second density. The second density is twice as large as the first density.

The apparatus for calculating equivalent mechanical parameters of the etching region of the film layer(s) provided in some embodiments of the present disclosure may perform the methods provided in some embodiments of the present disclosure above. In this way, it is easy to obtain accurate equivalent mechanical parameters, and the methods and apparatus are applicable to irregular etching regions.

Some embodiments of the present disclosure further provide a computer storage medium, which has stored thereon computer program codes. When one or more processors 101 of the terminal 10 (e.g., a computer) execute the computer program codes, the terminal is caused to perform the method for calculating equivalent mechanical parameters of an etching region of film layer(s) as shown in FIGS. 2a and 2b.

Some embodiments of the present disclosure further provide a computer program product. When the computer program product is run on a computer, the computer is caused to perform the method for calculating equivalent mechanical parameters of an etching region of film layer(s) as shown in FIGS. 2a and 2b.

It will be understood that, the above embodiments are merely exemplary embodiments employed to explain the principles of the present disclosure, but the present disclosure is not limited thereto. Various modifications and improvements can be made by a person skilled in the art without departing from the spirit and scope of the present disclosure, and such modifications and improvements are also within the scope of the present disclosure.

What is claimed is:

1. A method for calculating equivalent mechanical parameters of a film layer etching region, the method comprising:

selecting at least a portion of the film layer etching region as an analysis region;

establishing a planar model corresponding to the analysis region;

performing grid division on the planar model at a first density;

analyzing, by means of a finite element method, first simulated stresses of the planar model under simulated boundary conditions according to actual mechanical parameters of a film layer material and the grid division at the first density; and calculating equivalent mechanical parameters of the analysis region according to the first simulated stresses, to obtain the equivalent mechanical parameters of the etching region, wherein under the simulated boundary conditions, the equivalent mechanical parameters enable an anisotropic planar blind plate having a same size as that of a boundary of the planar model to reach the first simulated stresses.

2. The method for calculating equivalent mechanical parameters of the film layer etching region according to claim 1, the method further comprising:

performing grid division on the planar model at a second density, wherein the second density is different from the first density;

analyzing, by means of the finite element method, second simulated stresses of the planar model under the simulated boundary conditions according to the actual mechanical parameters of the film layer material and grid division at the second density; and comparing whether a difference ratio between each second simulated stress and a corresponding first simulated stress exceeds a threshold value; if yes, returning to the step of performing grid division on the planar model at a first density and reselecting a larger first density; if no, proceeding to a next step.

3. The method for calculating equivalent mechanical parameters of the film layer etching region according to claim 2, wherein the second density is greater than the first density.

4. The method for calculating equivalent mechanical parameters of the film layer etching region according to claim 2, wherein the difference ratio between each second simulated stress and a corresponding first simulated stress is a ratio of an absolute value of a difference between the second simulated stress and the first simulated stress to the second simulated stress; and the threshold value is 3%.

5. The method for calculating equivalent mechanical parameters of the film layer etching region according to claim 1, wherein the analysis region is a rectangular region having a first side and a third side parallel to an X direction, and a second side and a fourth side parallel to a Y direction, a length of the first side and the third side is $L_1$, and a length of the second side and the fourth side is $L_2$; and the X direction is perpendicular to the Y direction.

6. The method for calculating equivalent mechanical parameters of the film layer etching region according to claim 5, wherein $L_1$ is in a range of 0.001 mm to 0.5 mm; and $L_2$ is in a range of 0.001 mm to 0.5 mm.

7. The method for calculating equivalent mechanical parameters of the film layer etching region according to claim 1, wherein the simulated boundary conditions include a first boundary condition and a second boundary condition;

the first boundary condition is that: the first side, the third side, and the fourth side of the analysis region are fixed, and the second side is displaced by a product of $C_1$ and $L_1$ along the X direction away from the fourth side; under the first boundary condition, a first simulated stress at the second side along the X direction is $\sigma_{X1}$, and a first simulated stress at the third side along the Y direction is $\sigma_{Y1}$;

the second boundary condition is that: the first side, the second side, and the fourth side are fixed, and the third side is displaced by a product of $C_2$ and $L_2$ along the Y direction away from the first side; under the second boundary condition, a first simulated stress at the second side along the X direction is $\sigma_{X2}$, and a first simulated stress at the third side along the Y direction is $\sigma_{Y2}$, wherein $C_2$ and $L_2$ are strains of the planar model in corresponding directions.

8. The method for calculating equivalent mechanical parameters of the film layer etching region according to claim 7, wherein the equivalent mechanical parameters include an equivalent elastic modulus $E_X$ and an equivalent Poisson's ratio $V_{XY}$ in the X direction, and an equivalent elastic modulus $E_Y$ and an equivalent Poisson's ratio $V_{YX}$ in the Y direction, which are calculated by the following formulas:

$$\begin{bmatrix} E_X \\ E_Y \\ V_{XY} \\ V_{YX} \end{bmatrix} = \begin{bmatrix} \dfrac{\sigma_{X1} \times \sigma_{Y2} - \sigma_{Y1} \times \sigma_{X2}}{\sigma_{Y2} \times C_1} \\ \dfrac{\sigma_{X1} \times \sigma_{Y2} - \sigma_{Y1} \times \sigma_{X2}}{\sigma_{X1} \times C_2} \\ \dfrac{C_1 \times \sigma_{X2}}{C_2 \times \sigma_{X1}} \\ \dfrac{C_2 \times \sigma_{Y1}}{C_1 \times \sigma_{Y2}} \end{bmatrix}.$$

9. The method for calculating equivalent mechanical parameters of the film layer etching region according to claim 7, wherein $C_1$ is in a range of 0.0001 to 0.005; and $C_2$ is in a range of 0.0001 to 0.005.

10. The method for calculating equivalent mechanical parameters of the film layer etching region according to claim 1, wherein each grid obtained from the grid division is a square with a side length in a range of 0.003 mm to 0.02 mm.

11. The method for calculating equivalent mechanical parameters of the film layer etching region according to claim 1, wherein the actual mechanical parameters of the film layer material are actual mechanical parameters of the film layer material at a specified temperature.

12. A terminal, comprising:

a display;

a memory configured to store computer program codes, the computer program codes containing computer instructions; and one or more processors coupled to the display and the memory, the one or more processors being configured in a way that when the one or more processors execute the computer instructions, the terminal performs the method for calculating equivalent mechanical parameters of a film layer etching region according to claim 1.

13. The method for calculating equivalent mechanical parameters of the film layer etching region according to claim 3, wherein the second density is twice as large as the first density.

14. An apparatus for calculating equivalent mechanical parameters of a film layer etching region, the apparatus comprising:

an input interface configured to receive actual mechanical parameters of a film layer material input by a user;

a processor coupled to the input interface, wherein the processor is configured to:

select at least a portion of the film layer etching region as an analysis region;

establish a planar model corresponding to the analysis region;

perform grid division on the planar model at a first density;

analyze, by means of a finite element method, simulated stresses of the planar model under simulated boundary conditions according to the actual mechanical parameters of a film layer material and a current grid division; and calculate equivalent mechanical parameters of the analysis region according to the simulated stresses so as to obtain equivalent mechanical parameters of etching region, wherein under the simulated boundary conditions, the equivalent mechanical parameters enable an anisotropic planar blind plate having a same size as that of a boundary of the planar model to reach the simulated stresses.

15. The apparatus for calculating equivalent mechanical parameters of the film layer etching region according to claim 14, wherein the processor is further configured to:

perform grid division on the planar model at a second density, wherein the second density is different from the first density;

analyze, by means of the finite element method, second simulated stresses of the planar model under the simulated boundary conditions according to the actual mechanical parameters of the film layer material and grid division at the second density; and compare whether a difference ratio between each second simulated stress and a corresponding first simulated stress exceeds a threshold value; if yes, returning to the step of performing grid division on the planar model at a first density and reselecting a larger first density;

if no, proceeding to a next step.

16. The apparatus for calculating equivalent mechanical parameters of the film layer etching region according to claim 15, wherein the difference ratio between each second simulated stress and a corresponding first simulated stress is a ratio of an absolute value of a difference between the second simulated stress and the first simulated stress to the second simulated stress; and the threshold value is 3%.

17. The apparatus for calculating equivalent mechanical parameters of the film layer etching region according to claim 14, wherein the analysis region is a rectangular region having a first side and a third side parallel to an X direction, and a second side and a fourth side parallel to a Y direction; a length of the first side and the third side is $L_1$, and a length of the second side and the fourth side is $L_2$; and the X direction is perpendicular to the Y direction.

18. The apparatus for calculating equivalent mechanical parameters of the film layer etching region according to claim 14, wherein the simulated boundary conditions include a first boundary condition and a second boundary condition;

the first boundary condition is that: the first side, the third side, and the fourth side of the analysis region are fixed, and the second side is displaced by a product of $C_1$ and $L_1$ along the X direction away from the fourth side; under the first boundary condition, a simulated stress at the second side along the X direction is $\sigma_{X1}$, and a simulated stress at the third side along the Y direction is $\sigma_{Y1}$;

the second boundary condition is that: the first side, the second side, and the fourth side are fixed, and the third side is displaced by a product of $C_2$ and $L_2$ along the Y direction away from the first side; under the second boundary condition, a simulated stress at the second side along the X direction is $\sigma_{X2}$, and a simulated stress at the third side along the Y direction is $\sigma_{Y2}$; and the equivalent mechanical parameters include an equivalent elastic modulus $E_X$ and an equivalent Poisson's ratio $V_{XY}$ in the X direction, and an equivalent elastic modulus $E_Y$ and an equivalent Poisson's ratio $V_{YX}$ in the Y direction, which are calculated by the following formulas:

$$\begin{bmatrix} E_X \\ E_Y \\ V_{XY} \\ V_{YX} \end{bmatrix} = \begin{bmatrix} \dfrac{\sigma_{X1} \times \sigma_{Y2} - \sigma_{Y1} \times \sigma_{X2}}{\sigma_{Y2} \times C_1} \\ \dfrac{\sigma_{X1} \times \sigma_{Y2} - \sigma_{Y1} \times \sigma_{X2}}{\sigma_{X1} \times C_2} \\ \dfrac{C_1 \times \sigma_{X2}}{C_2 \times \sigma_{X1}} \\ \dfrac{C_2 \times \sigma_{Y1}}{C_1 \times \sigma_{Y2}} \end{bmatrix}.$$

19. The apparatus for calculating equivalent mechanical parameters of the film layer etching region according to claim 14, wherein the actual mechanical parameters of the film layer material are actual mechanical parameters of the film layer material at a specified temperature.

20. A non-transitory computer-readable storage medium storing executable instructions that, when executed by a terminal, cause the terminal to perform the method for calculating equivalent mechanical parameters of the film layer etching region according to claim 1.

* * * * *